United States Patent [19]
Ando et al.

[11] Patent Number: 6,125,978
[45] Date of Patent: Oct. 3, 2000

[54] ONE-WAY CLUTCH

[75] Inventors: Tomoharu Ando; Masanori Tateishi, both of Shizuoka-ken, Japan

[73] Assignee: NSK-Warner K.K., Tokyo, Japan

[21] Appl. No.: 09/185,712

[22] Filed: Nov. 4, 1998

[30] Foreign Application Priority Data

Nov. 5, 1997 [JP] Japan ..................................... 9-317759

[51] Int. Cl.⁷ .............................. F16D 11/06; F16D 15/00
[52] U.S. Cl. ........................................ 192/41 A; 192/45.1
[58] Field of Search ................... 192/41 A, 45, 192/45.1

[56] References Cited

U.S. PATENT DOCUMENTS

| | | |
|---|---|---|
| 5,000,303 | 3/1991 | Shoji et al. |
| 5,035,309 | 7/1991 | Takada ........................................ 192/45 |
| 5,067,601 | 11/1991 | Castens ................... 192/45 X |
| 5,139,123 | 8/1992 | Rutke ................. 192/41 A X |
| 5,758,755 | 6/1998 | Igari . |
| 5,842,548 | 12/1998 | Sato et al. ............... 192/45.1 |
| 5,894,915 | 4/1999 | Igari et al. ......................... 192/41 A X |
| 5,979,626 | 11/1999 | Igari et al. ............................. 192/45.1 |

*Primary Examiner*—Rodney H. Bonck
*Assistant Examiner*—Roger Pang
*Attorney, Agent, or Firm*—Evenson, McKeown, Edwards & Lenahan, P.L.L.C.

[57] ABSTRACT

A one-way clutch comprises plural sprags to be arranged between an outer ring and an inner ring, a retainer holding the sprags in place, and a spring guided by the retainer to urge the sprags in wedging directions. The retainer comprises a cylindrical part provided with sprag windows, which serve to retain the sprags, and a flange extending from one of opposite ends of the cylindrical part in radial directions of the cylindrical part and provided with plural slits, and is formed of a resiliently-deformable material. The flange comprises large-diameter portions and small-diameter portions separated from each other by the slits. The large-diameter portions of the flange can be press-fitted in a flange-receiving slot formed in an inner peripheral wall of the outer ring by causing the large-diameter portions to flex owing to the resiliency of the retainer, whereby the large-diameter portions can be maintained in engagement with the flange-receiving slot.

6 Claims, 6 Drawing Sheets

ONE-WAY CLUTCH

BACKGROUND OF THE INVENTION a) Field of the Invention

This invention relates to a sprag-type one-way clutch, which is adapted to be mounted between a driving shaft and a driven shaft in an automotive vehicle, general industrial equipment or the like so that motive power of rotation of the driving shaft, said rotation being only in one direction, can be transmitted to the driven shaft.

b) Description of the Related Art

A sprag-type one-way clutch is mounted between a driving shaft and a driven shaft and by way of sprags arranged between an outer ring and an inner ring, transmits rotational force of one direction from the driving shaft to the driven shaft.

When the rotational force of the one direction is applied from the driving shaft to the sprags, the sprags are wedged between the outer ring and the inner ring so that torque is transmitted to the driven shaft. Upon application of rotational force of an opposite direction, however, the sprags remain unwedged between the outer ring and the inner ring so that no transmission of torque takes place between the driving shaft and the driven shaft.

FIGS. 6 and 7 illustrate one example of such clutches.

A one-way clutch 40 is provided with plural sprags 43, which are to be wedged between an outer ring 41 and an inner ring 42, and also with a retainer 45 which is disposed between the outer ring 41 and the inner ring 42 and holds the sprags 43 in place.

The retainer 45 is constructed of a cylindrical part 48, through which sprag windows 44 are formed for retaining the sprags 43 (see FIG. 7), and a flange 47 which is formed in an elliptic or oval shape having a short-diameter portion and a long-diameter portion B (see FIG. 6).

A ring-shaped spring 46 has been mounted before-hand on the cylindrical part 48 of the retainer 45. When the sprags 43 are inserted in the sprag windows 44 of the cylindrical part 48 and the spring 46 is then fitted in spring-receiving slots formed on the respective sprags 43, the sprags 43 are retained in the corresponding sprag windows 44 under pressing force of the spring 46.

As a result, the plural sprags 43 are arranged on the retainer 45 so that the one-way clutch 40 is constructed.

Subsequent to the arrangement of the plural sprags 43 on the retainer 45, the one-way clutch 40 is mounted between the outer ring 41 and the inner ring 42 so that the inner ring 42 is located on an inner side of the retainer 45 and the outer ring 41 is positioned on an outer side of the retainer 45.

Upon mounting the clutch 40, the flange 47 of the retainer 45 is brought into contact under pressure with a circular counterbore 50 formed on a side wall of the outer ring 41. As the flange 47 is formed in the elliptic or oval shape having the short-diameter portion and the long-diameter portion B, the long-diameter portion B of the flange 47 is press-fitted in the counterbore 50, whereby the outer ring 42 and the one-way clutch 40 are fixed together.

The mounting of the one-way clutch 40 is feasible only when the counterbore 50 is formed on the side wall of the outer ring 41, and moreover, nothing is arranged or formed to restrain the thus-mounted one-way clutch 40 relative to an axial direction. Accordingly, an additional member is required to restrain the one-way clutch 40 relative to the axial direction.

Further, the clutch 40 must always be inserted through a mounting opening from the side of the cylindrical part 48 which is smaller in diameter. A limitation is therefore imposed without exception on the working direction of the one-way clutch 40 so mounted.

SUMMARY OF THE INVENTION

With the above-described drawbacks of the conventional one-way clutches in view, the present invention therefore has as an object thereof the provision of a one-way clutch, which can be easily mounted between an inner ring and an outer ring without imposing a limitation on the fixing structure of a member, on which the one-way clutch is to be mounted, and without imposing a limitation on its mounting direction, and which can be restrained relative to an axial direction without needing an additional member.

To achieve the above-described object, the present invention provides a one-way clutch comprising plural sprags to be arranged between an outer ring and an inner ring, a retainer holding the sprags in place, and a spring guided by the retainer to urge the sprags in wedging directions, wherein:

the retainer comprises a cylindrical part provided with sprag windows, which serve to retain the sprags, and a flange extending from one of opposite ends of the cylindrical part in radial directions of the cylindrical part and provided with plural slits, and is formed of a resiliently-deformable material;

the flange comprises large-diameter portions and small-diameter portions separated from each other by the slits; and the large-diameter portions of the flange can be press-fitted in a flange-receiving slot formed in an inner peripheral wall of the outer ring by causing the large-diameter portions to flex owing to the resiliency of the retainer, whereby the large-diameter portions can be maintained in engagement with the flange-receiving slot.

The flange-receiving slot, in which the large-diameter portions of the flange of the one-way clutch according to the present invention are press-fitted by making use of the resiliently-deformable property of the flange, is formed in the outer ring.

Upon mounting the one-way clutch according to the present invention between the outer ring and the inner ring, the large-diameter portions of the flange of the retainer are caused to flex by making use of the resiliently-deformable property of the flange. The flange is then moved, that is, adjusted in position between the outer ring and the inner ring. When the large-diameter portions of the flange reach the flange-receiving slot formed in the outer ring, the large-diameter portions which have been flexed due to resilient deformation tend to return into their original shapes. As a consequence, the large-diameter portions of the flange engage the slot formed in the outer ring.

The depth of the flange-receiving slot of the outer ring is set, relative to the outer diameter of the large-diameter portions of the flange, at such a value that the flange does not disengage during normal operations.

Preferably, the large-diameter portions of the flange may have an outer diameter greater than an inner diameter of the outer ring, and the small-diameter portions may have an outer diameter smaller than the inner diameter of the outer ring.

Upon mounting the one-way clutch according to the present invention between the outer ring and the inner ring, it is possible to move the one-way clutch freely inside the outer ring by making use of the resiliently deformable property of the large-diameter portions of the flange. The one-way clutch according to the present invention therefore has an advantage in that no limitation is imposed on a fixing structure of a member on which the one-way clutch is to be mounted and also has another advantage in that no limitation is imposed on the mounting direction of the one-way clutch.

Preferably, a diameter of the cylindrical part may gradually increase toward the one end from which the flange extends, and a wall of the flange, said wall being located on a side of the cylindrical part, may be inclined at an inner peripheral end portion thereof toward an outer peripheral wall of the cylindrical part and in a direction toward the other one of the opposite ends of the cylindrical part. Tabs may preferably be formed on outer peripheries of the large-diameter portions of the flange, respectively. These preferred features can facilitate control of "drag".

A dismounting-facilitating notch may preferably be formed on the flange. Preferably, the dismounting-facilitating notch may be formed on one of the large-diameter portions of the flange. These preferred features can facilitate dismounting of the mounted one-way clutch.

BRIEF DESCRIPTION OF THE DRAWINGS

FIGS. 2A and 2B illustrate a retainer used in the one-way clutch according to the first embodiment of the present invention, in which FIG. 2A is a front view of the retainer and FIG. 2B is a vertical cross-sectional view taken in the direction of arrows IIB—IIB of FIG. 2A;

FIGS. 3A through 3C show the one-way clutch according to the first embodiment of the present invention as mounted between an outer ring and an inner ring, in which FIG. 3A illustrates the one-way clutch mounted in an outer ring having no closed end, FIG. 3B depicts the one-way clutch mounted in an outer ring having a closed end on a left-hand side, and FIG. 3C shows the one-way clutch mounted in an outer ring having a closed end on a right-hand side;

FIGS. 4A and 4B depict a retainer used in the one-way clutch according to the second embodiment of the present invention, in which FIG. 4A is a front view and FIG. 4B is a vertical cross-sectional view taken in the direction of arrows IVB—IVB of FIG. 4A;

FIGS. 5A and 5B show a retainer used in a one-way clutch according to a third embodiment of the present invention, in which FIG. 5A is a front view and FIG. 5B is a vertical cross-sectional view taken in the direction of arrows VB—VB of FIG. 5A;

DETAILED DESCRIPTION OF THE PREFERRED EMBODIMENTS

Figure 1:
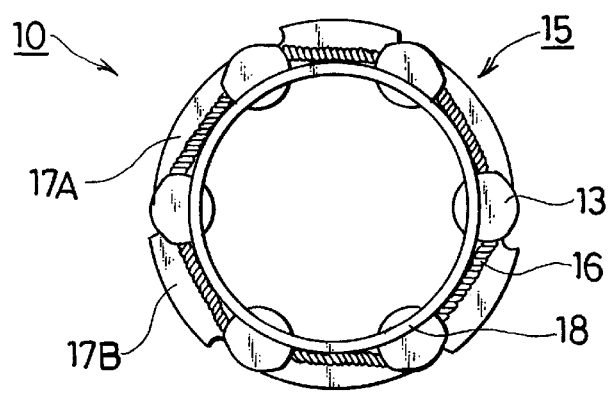
FIG. 1 is a front view of a one-way clutch according to a first embodiment of the present invention.

With reference to FIG. 1 through FIG. 3, the one-way clutch 10 according to the first embodiment of the present invention will be described.

Reference is first made to FIG. 1. Like the conventional one-way clutch 40, the one-way clutch 10 is provided with plural sprags 13 which are to be wedged between an outer ring 21 and an inner ring 22, and also with a retainer 15 which is disposed between the outer ring 21 and the inner ring 22 and holds the sprags 13 in place.

Figure 2A:
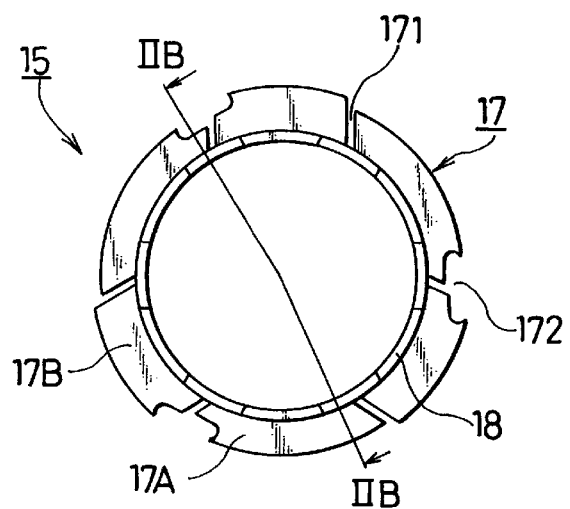
Figure 2B:
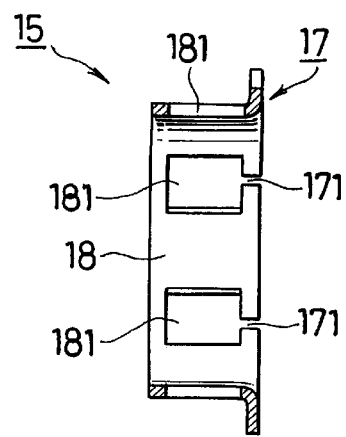

Reference is next made to FIG. 2A and FIG. 2B. The retainer 15 is made, for example, of a thin steel sheet to facilitate resilient deformation, and is constructed of a flange 17 and a cylindrical portion 18.

Sprag windows 181, which serve to receive the sprags 13 therein and to hold them in place, are formed in the cylindrical portion 18.

Through the flange 17, slits 171 are formed extending from an outer periphery of the flange to the respective sprag windows 181. The number of the slits 171 is as much as 6 in total. By these six slits 171, the flange 17 is divided so that three large-diameter portions 17B and three small-diameter portions 17A are alternately arranged. It is to facilitate resilient deformation of the large-diameter portions 17B, said resilient deformation being to be described subsequently herein, that the slits 171 are formed extending to the respective sprag windows 181. To further facilitate the resilient deformation, the slits on opposite sides of each large-diameter portion 17B extend in a substantially parallel relation with each other.

The slits 171 are formed as many as six in FIG. 2B. This is however merely illustrative. Therefore, the number of the slits 171 should not be limited to six. These slits can be formed as many as desired provided that they can divide flange 17 into at least two large-diameter portions 17B and two small-diameter portions 17A.

In an outer periphery of the flange 17, substantially rectangular, dismounting-facilitating notches 172 are formed at equal intervals at three locations between the large-diameter portions 17B and their adjacent small-diameter portions 17A.

These dismounting-facilitating notches 172 not only facilitate dismounting of the already mounted clutch 10 but also are usable as oiling holes for the mounted clutch 10. It is to be noted that the number and shape of such dismounting-facilitating notches should not be limited to those shown in FIG. 2A insofar as the dismounting-facilitating notches have the above-mentioned functions. For example, dismounting facilitating notches may be formed only in the large diameter portions 17B.

A ring-shaped coil spring 16 has been mounted beforehand on the cylindrical part 18 of the retainer 15. When the sprags 13 are inserted in the respective sprag windows 181 of the cylindrical part 18 and the coil spring 16 is fitted in spring-receiving slots 131 formed in the sprags 13, the sprags 13 are held in the sprag windows 181 under pressing force of the coil spring 16.

The plural sprags 13 are mounted on the retainer 15 as described above, whereby the one-way clutch 10 is constructed.

After the plural sprags 13 have been mounted on the retainer 15, the thus-constructed one-way clutch 10 is mounted in such a way that the inner ring 22 is located inside the retainer 15 and the outer ring 21 is positioned outside the retainer 15.

Figure 3A:
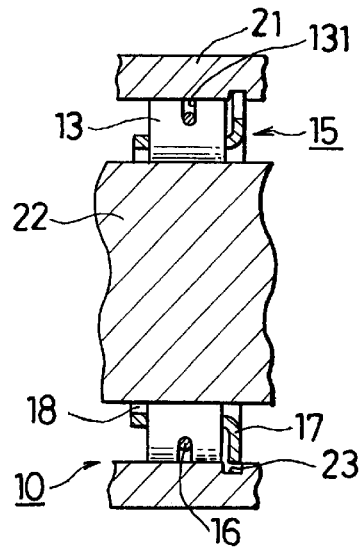
Figure 3B:
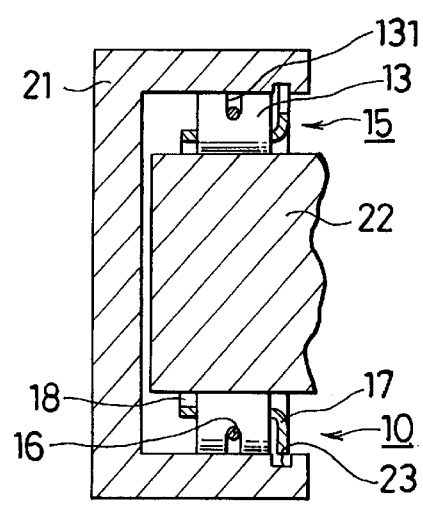
Figure 3C:
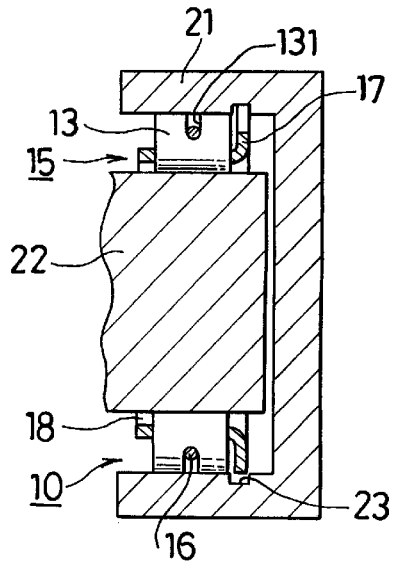

Referring now to FIG. 3A through FIG. 3C, a flange-receiving slot 23 is formed in the outer ring 21 to receive the large-diameter portions 17B of the flange 17 of the retainer 15 therein and hence to fix the retainer 15.

The flange-receiving slot 23 is formed at a predetermined position on an inner wall of the outer ring, coaxially with the outer ring 21, to such a depth that the flange-receiving slot 23 has an inner diameter greater than the outer diameter of the small-diameter portions 17A of the flange 17 but smaller than the outer diameter of the large-diameter portions 17B of the flange 17.

Upon mounting the clutch 10 between the outer ring 21 and the inner ring 22, the clutch 10 cannot be inserted, as is, into the outer ring 21 because the large-diameter portions 17B of the flange 17 are formed greater than the inner diameter of the outer ring 21.

However the large-diameter portions 17B are allowed to flex easily owing to the slits 171 formed in the resilient flange 17. It is therefore possible to easily move the retainer 15 to a desired position within the outer ring 21.

When the retainer 15 is moved to the position of the flange-receiving slot 23 formed on the inner wall of the outer ring 21 while the large-diameter portions 17B are maintained flexed, the large-diameter portions 17B tend to return into their original shapes and are hence allowed to fit in the flange-receiving slot 23, whereby the large-diameter portions 17B are fixedly secured.

This fixed state is required to have stability to such an extent as preventing disengagement of the large-diameter portions 17B under normal use conditions. The stability of the fixed state can be adjusted as desired by adjusting the depth of the flange-receiving slot 23 and the value of the outer diameter of the large-diameter portions 17B before their deformation.

The one-way clutch 10 according to the present invention can be mounted on an outer ring of a desired shape insofar as the outer ring is provided with the flange-receiving slot 23 as described above.

Further, the one-way clutch 10 according to the present invention can be inserted into the mounting opening either from the side of the cylindrical part 18 of the retainer 15 or from the side of the flange 17 of the retainer 15. This makes it possible to allow the one-way clutch to operate in a desired direction.

Figure 4A:
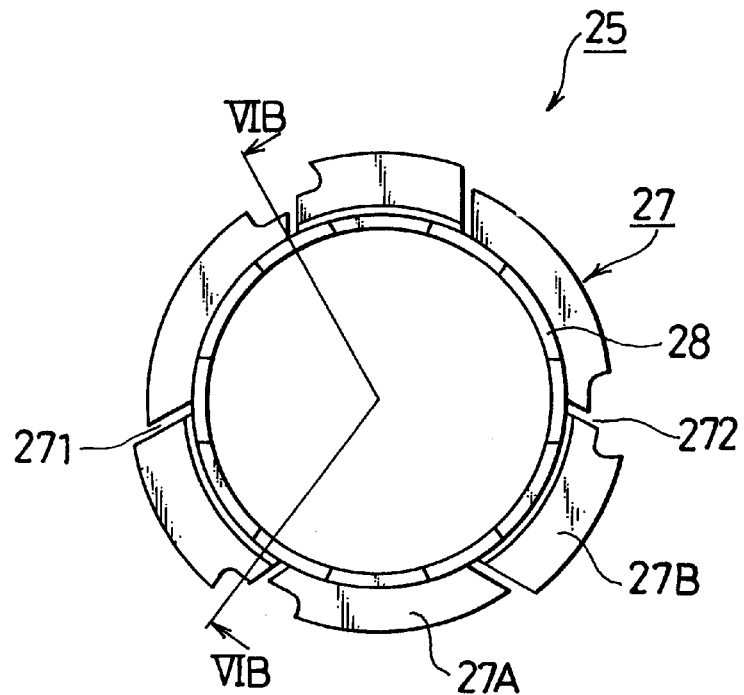

The retainer for use in the one-way clutch according to the second embodiment of the present invention will next be described with reference to FIGS. 4A and 4B.

Like the retainer 15 used in the clutch 10 according to the first embodiment, this retainer 25 also comprises a flange 27 and a cylindrical part 28, is formed of a thin steel sheet or the like, and can readily undergo resilient deformation.

Similar to the retainer 15 used in the clutch 10 according to the first embodiment, sprag windows 281 are formed through the cylindrical part 28 to receive the sprags 13, and slits 271 are formed in the flange 27 to divide the flange 27 into large-diameter portions 27B and small-diameter portions 27A. Further, dismounting-facilitating notches 272 are formed in the flange 27.

The outer diameter of the large-diameter portions 27B is set somewhat greater than the inner diameter of the flange-receiving slot 23 formed in the outer ring 21.

Figure 4B:
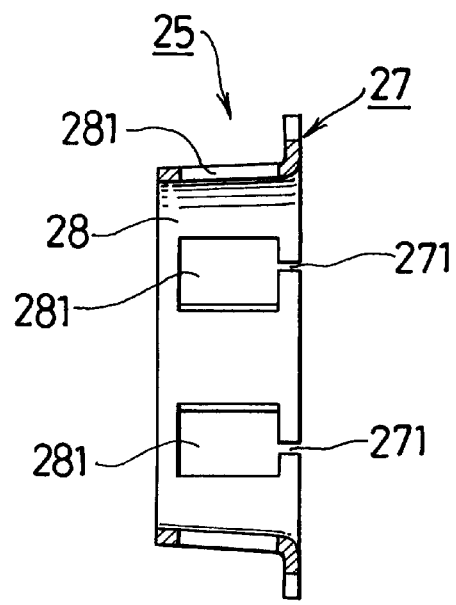

As is shown in FIG. 4B, the diameter of the cylindrical part 28 gradually increases toward the flange 27 from a side opposite to the flange 27. This shape facilitates the mounting of the one-way clutch from the side of the cylindrical part 28.

In this embodiment, the flange 27 is formed at a portion thereof connected to the cylindrical part 28 in such a way that one of side walls of the flange 27, said one wall being located on the side of the cylindrical part 28, is inclined at an inner peripheral end portion thereof toward an outer peripheral wall of the cylindrical part 28 and in a direction toward the opposite end of the cylindrical part 28.

On the retainer 25 of the above-described construction, plural sprags 13 are mounted as in the case of the retainer 15 according to the first embodiment.

Subsequent to the mounting of the plural sprags 13, the clutch is mounted so that it is located between the outer ring and the inner ring 22.

Upon engagement of the large-diameter portions 27B of the flange 27 with the flange-receiving slot 23 in the inner wall of the outer ring 21, the large-diameter portions 27B are brought into forms resiliently deformed in a radius-reducing direction.

Resilient force, which has been produced owing to the resilient deformation of the large-diameter portions 27B, acts on the cylindrical part 28 via the connecting portion between the flange 27 and the cylindrical part 28, whereby the connecting portion between the flange 27 and the cylindrical part 28 also resiliently deform in a radius-reducing direction toward a central axis of the cylindrical part 28. In the state fixed on the outer ring 21, the diameter of the cylindrical part 28 of the retainer 25 is thus substantially the same over the entire outer periphery of the cylindrical part 28.

Under resilient repulsion produced by the resilient deformation of the flange 27 and the cylindrical part 28, the large-diameter portions 27B of the flange 27 are pressed against the flange-receiving slot 23, so that frictional force is produced between the large-diameter portions 27B and the flange-receiving slot 23. It is therefore possible to control the value of so-called "drag" by adjusting the frictional force on the basis of an adjustment in the inclination between the flange 27 and the cylindrical part 28.

Figure 5A:
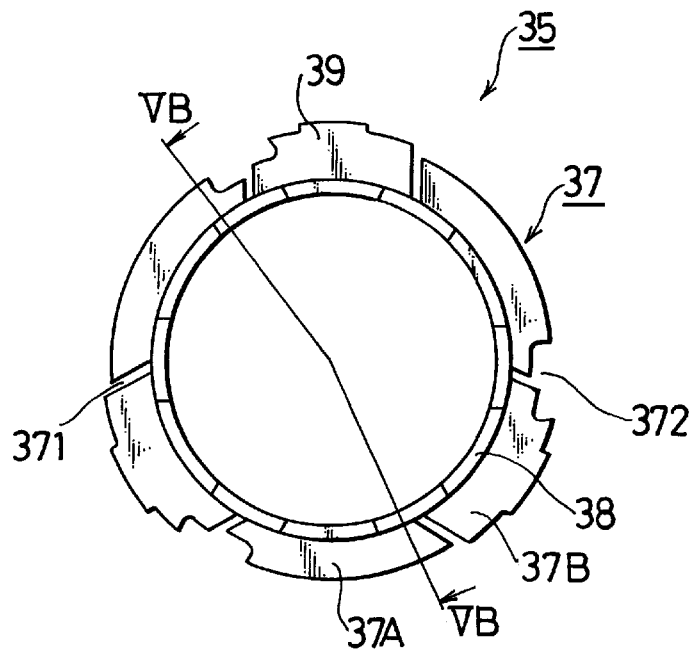
Figure 5B:
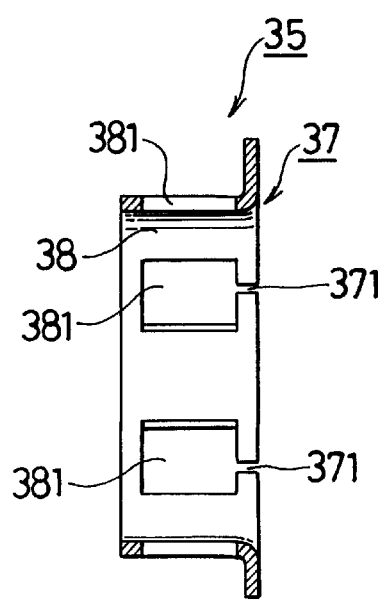
Figure 6:
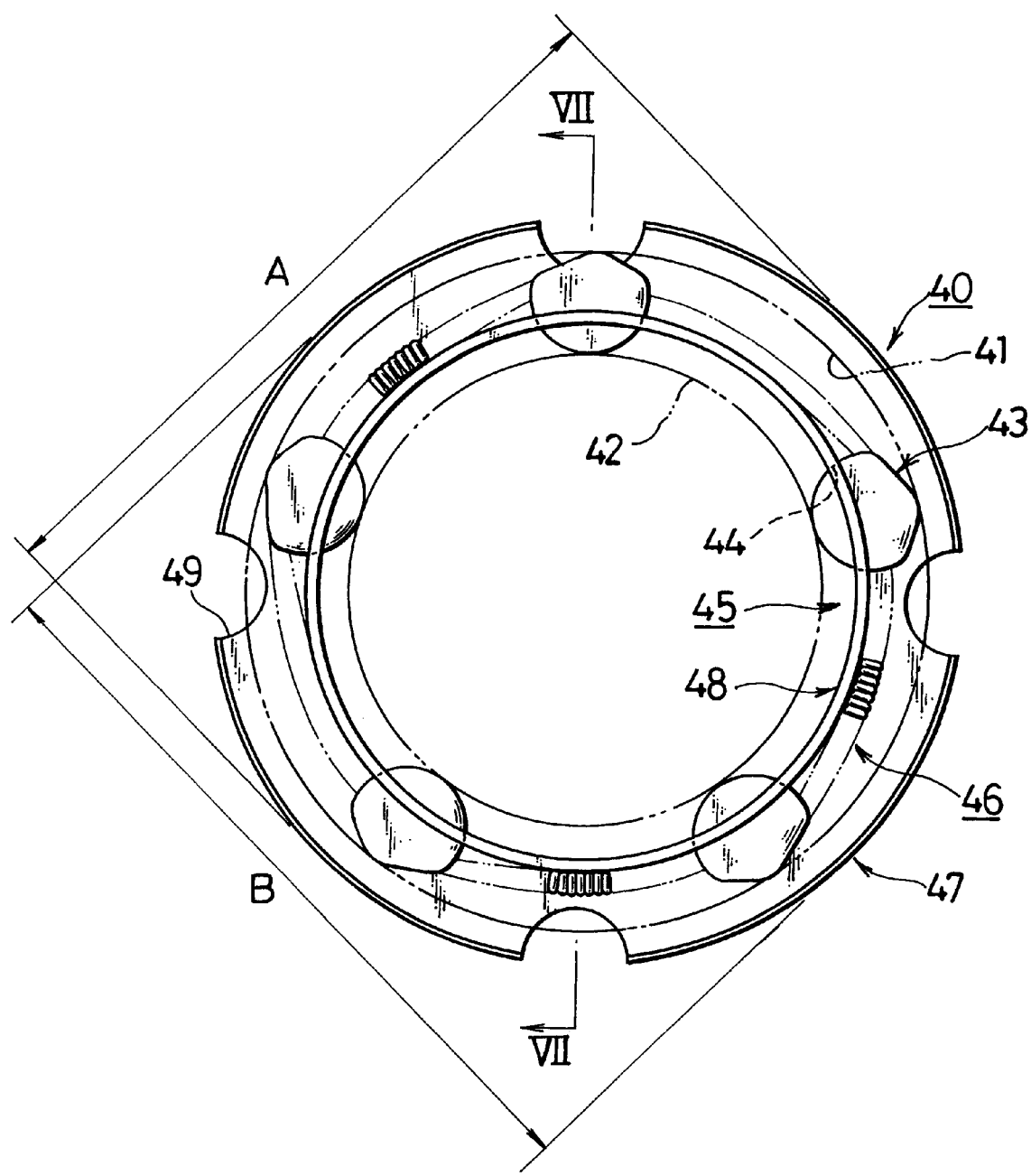
FIG. 6 is a front view of a conventional sprag-type one-way clutch.
Figure 7:
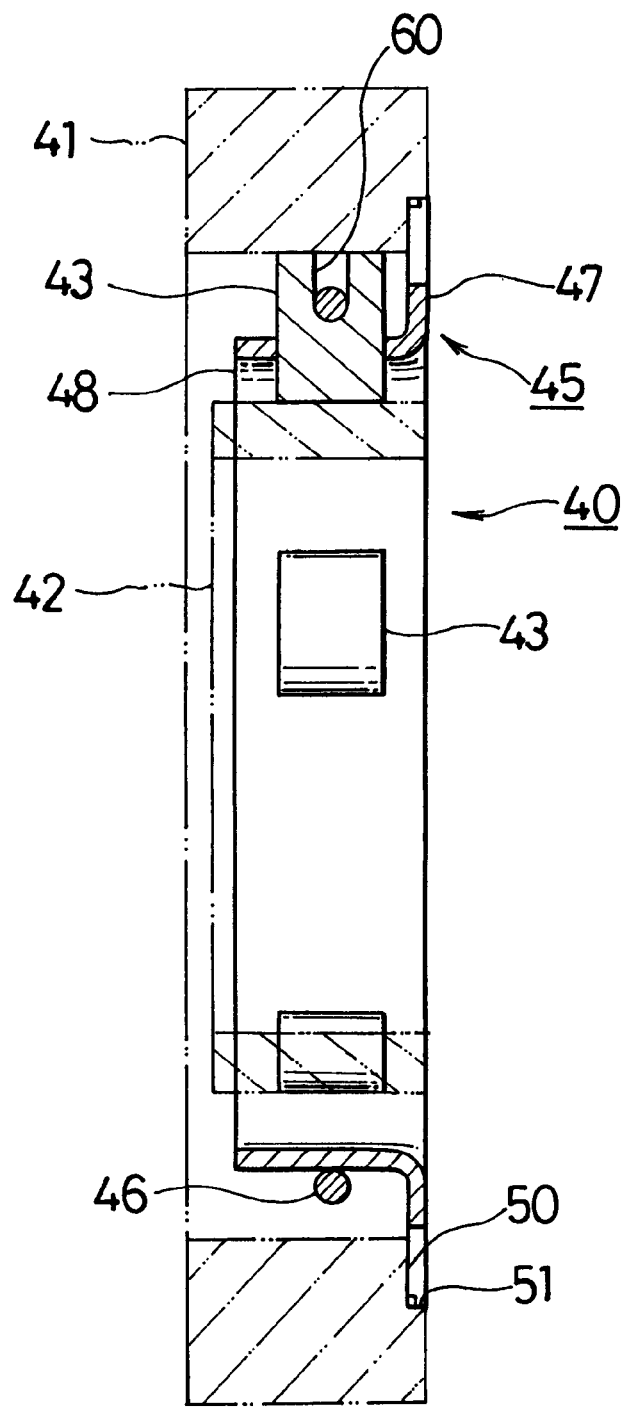
FIG. 7 is a vertical cross-sectional view taken in the direction of arrows VII—VII of FIG. 6.

Finally, the retainer for use in the one-way clutch according to the third embodiment of the present invention will be described with reference to FIGS. 5A and 5B.

Like the retainer 15 used in the clutch 10 according to the first embodiment, this retainer 35 also comprises a flange 37 and a cylindrical part 38, is formed of a thin steel sheet or the like, and can readily undergo resilient deformation.

Similar to the retainer 15 used in the clutch 10 according to the first embodiment, sprag windows 381 are formed through the cylindrical part 38 to receive the sprags 13, and slits 371 are formed in the flange 37 to divide the flange 37 into large-diameter portions 37B and small-diameter portions 37A. Further, dismounting-facilitating notches 372 are formed in the flange 37.

The outer diameter of the large-diameter portions 37B is set somewhat greater than the inner diameter of the flange-receiving slot 23 formed in the outer ring 21.

Tabs 39 are formed on outer peripheries of the large-diameter portions 37B, respectively, so that the tabs 39 protrude out from the outer peripheries in a radial direction.

Owing to the formation of the tabs 39 as described above, the outer diameter of the large-diameter portions 37B in this embodiment is greater than the outer diameters of the large-diameter portions 17B,27B of the flanges 17,27 in the first and second embodiments.

When the large-diameter portions 37B of the flange 37 engage the flange-receiving slot 23 in the inner wall of the outer ring 21, the large-diameter portions 37B are brought into forms resiliently deformed in a radius-reducing direction.

Under resilient repulsion produced by the resilient deformation of the flange 37, the tabs 39 of the large-diameter portions 37B are pressed against the flange-receiving slot 23.

The magnitude of frictional force between the tabs 39 and the flange-receiving slot 23, that is, the level of "drag", can be adjusted by changing the protrusion of the tabs 39 from the outer peripheries of the corresponding large-diameter portions 37B.

The above-disclosed embodiments can be practiced by combining them as desired.

This application claims the priority of Japanese Patent Application No. HEI 9-317759 filed Nov. 5, 1997, which is incorporated herein by reference.

What is claimed is:

1. A single-cage cam clutch comprising plural sprags to be arranged between an outer ring and an inner ring, a retainer holding said sprags in place, and a spring guided by said retainer to urge said sprags in wedging directions, wherein:

said retainer comprises a cylindrical part provided with sprag windows, which serve to retain said sprags, and a flange extending from one of opposite ends of said cylindrical part in radial directions of said cylindrical part and provided with plural slits, and is formed of a resiliently-deformable material;

said flange comprises large-diameter portions and small-diameter portions separated from each other by said slits; and said large-diameter portions of said flange are press-fitted in a flange-receiving slot formed in an inner peripheral wall of said outer ring by causing said large-diameter portions to flex owing to the resiliency of said retainer so that said large-diameter portions can be maintained in engagement with said flange-receiving slot.

2. A single-cage cam clutch according to claim 1, wherein said large-diameter portions of said flange have an outer diameter greater than an inner diameter of said outer ring, and said small-diameter portions have an outer diameter smaller than said inner diameter of said outer ring.

3. A single-cage cam clutch according to claim 1, wherein a diameter of said cylindrical part gradually increases toward said one end from which said flange extends; wherein a wall of said flange located on a side of said cylindrical part is inclined at an inner peripheral end portion thereof toward an outer peripheral wall of said cylindrical part and in a direction toward the other one of said opposite ends of said cylindrical part; and wherein the sprags have central axes parallel to the axial direction of the inner ring.

4. A single-cage cam clutch according to claim 1, wherein tabs are formed on outer peripheries of said large-diameter portions of said flange, respectively.

5. A single-cage cam clutch comprising plural sprags to be arranged between an outer ring and an inner ring, a retainer holding said sprags in place, and a spring guided by said retainer to urge said sprags in wedging directions, wherein:

said retainer comprises a cylindrical part provided with sprag windows, which serve to retain said sprags, and a flange extending from one of opposite ends of said cylindrical part in radial directions of said cylindrical part and provided with plural slits, and is formed of a resiliently-deformable material;

said flange comprises large-diameter portions and small-diameter portions separated from each other by said slits;

said large-diameter portions of said flange are press-fitted in a flange-receiving slot formed in an inner peripheral wall of said outer ring by causing said large-diameter portions to flex owing to the resiliency of said retainer, whereby said large-diameter portions can be maintained in engagement with said flange-receiving slot; and a dismounting-facilitating notch is formed on said flange.

6. A one-way clutch according to claim 5, wherein said dismounting-facilitating notch is formed on one of said large-diameter portions of said flange.

* * * * *